United States Patent [19]

Andrews et al.

[11] Patent Number: 4,933,392

[45] Date of Patent: Jun. 12, 1990

[54] CURABLE EPOXIDE RESIN COMPOSITIONS

[75] Inventors: Christopher M. Andrews, Cambridge; Christopher H. Bull, Trumpington; Christopher G. Demmer, Saffron Walden; William M. Rolfe, Suffolk, all of England

[73] Assignee: Ciba-Geigy Corporation, Ardsley, N.Y.

[21] Appl. No.: 376,796

[22] Filed: Jul. 7, 1989

[30] Foreign Application Priority Data

Jul. 9, 1988 [GB] United Kingdom ............... 8816412
Apr. 29, 1989 [GB] United Kingdom ............... 8909943

[51] Int. Cl.$^5$ .................. C08L 61/34; C08L 63/02
[52] U.S. Cl. ................................ 525/110; 525/486; 525/488; 525/113
[58] Field of Search ............... 525/488, 486, 109, 110, 525/113

[56] References Cited

U.S. PATENT DOCUMENTS

| | | | |
|---|---|---|---|
| 3,773,721 | 11/1973 | Tiedeman | 525/488 |
| 3,786,025 | 1/1974 | Freeman et al. | 525/488 |
| 3,896,081 | 7/1975 | Baxter et al. | 525/488 |
| 4,659,779 | 4/1987 | Bagga et al. | 525/118 |
| 4,701,378 | 10/1987 | Bagga et al. | 525/486 |

FOREIGN PATENT DOCUMENTS 61-113610  5/1986  Japan ................................ 525/110

OTHER PUBLICATIONS

Derwent 73-78423u/51, Maruzen Oil Co., "Cationic Polyelectrolyte Production-by Reacting Poly-p-hydroxystyrene with Formaldehyde and Secondary Amine".

*Primary Examiner*—John C. Bleutge
*Assistant Examiner*—Robert E. L. Sellers, II
*Attorney, Agent, or Firm*—Luther A. R. Hall

[57] ABSTRACT

Curable compositions comprise:
(A) an epoxide resin
(B) as latent curing agent for (A), dicyandiamide or a polycarboxylic acid hydrazide, and
(C) as cure accelerator dispersed as a powder in the composition, a Mannich base of a polymeric phenol.

The compositions are particularly useful as adhesives and sealants.

18 Claims, No Drawings

CURABLE EPOXIDE RESIN COMPOSITIONS

This invention relates to curable compositions which can be used as adhesives, sealants, laminating resins, and coatings.

The use of epoxide resins in adhesives and coatings has been commercial practice for several decades. Many hardeners for epoxide resins are reactive at room temperature and so need to be mixed with the epoxide just prior to use. Others are stable in admixture with the epoxide resin at room temperature, and harden only when heated to elevated temperatures. These hardeners, the so-called 'latent hardeners', or 'latent curing agents', are available commercially and include dicyandiamide and polycarboxylic acid hydrazides.

Compositions containing an epoxide resin and a latent hardener generally take 15 minutes to 1 hour to cure at temperatures of about 180° C. Cure times can be shortened by incorporation of latent accelerators which have little effect on storage stability at ambient temperatures but which enable gelation of the mixture to take place within about 30 minutes at 120° C. For instance, if dicyandiamide is used as the hardener, a substituted phenylurea, such as N-(4-chlorophenyl)-N',N'-dimethylurea, is often used as an accelerator. A more rapid gelation of such mixtures may be obtained by heating to a higher temperature but, at temperatures of around 200° C., this type of accelerator evolves volatiles which cause bubbling in the hardening mixture. The presence of such bubbles in a glue line is obviously a very serious drawback, since any bond so affected is much weaker than one formed with no bubbles. Similarly a bubbled mixture could not be used to prepare satisfactory coatings or laminates. It is therefore common practice to cure such mixtures at temperatures below about 150° C., at which temperature gelation takes about 5 minutes.

There is a desire in some sections of the automobile industry to replace spot welding of some components by adhesive bonding. In order to compete with welding, an adhesive is required that is capable of gelling within a few seconds at high temperature and which will give a cured product of high joint strength. In order to maintain production line speed it is essential that components to be joined are heated rapidly. Induction heating is a very rapid heating method, giving high temperatures within a few seconds. However, if such a heating method is used, fine control over the temperature is often difficult because of the geometry of the assembly. Accelerators that cause bubbling at high temperature are therefore unsuitable.

Epoxide resins form bonds of very high strength, and would be suitable for the bonding of automobile components except that conventional formulations suffer from one or more of the following drawbacks: insufficient stability on ambient temperature storage, insufficient rapidity of hardening when heated, and formation of bubbles at high curing temperatures.

Curable epoxide resin compositions containing dicyandiamide or a polycarboxylic acid hydrazide as latent hardener and, as accelerator, a solid solution of a nitrogen base having a boiling point above 130° C. and a polymer of an ethylenically unsaturated phenol are described in U.S. Pat. No. 4,659,779. Similar compositions in which the accelerator is a solid solution of a nitrogen base having a boiling point above 130° C. and a phenol-aldehyde resin are described in U.S. Pat. No. 4,701,378. The compositions described in the two U.S. patents are storage stable formulations which cure rapidly at temperatures of 180°-200° C. without formation of bubbles. There is still a need for curable epoxide resin compositions containing dicyandiamide or a polycarboxylic acid hydrazide as hardener which have prolonged storage stability but which cure rapidly at temperatures of 160° C. upwards without bubble formation.

Accordingly, the present invention provides a curable composition comprising:
(A) an epoxide resin,
(B) as latent curing agent for (A), dicyandiamide or a polycarboxylic acid hydrazide, and
(C) as cure accelerator dispersed as a powder in the composition, a Mannich base of a polymeric phenol.

Suitable epoxide resins (A) include those having, on average, more than one glycidyl group per molecule directly attached to an atom or atoms of oxygen, nitrogen, or sulphur.

As examples of such resins may be mentioned polyglycidyl esters obtainable by reaction of a compound containing two or more carboxylic acid groups per molecule with epichlorohydrin, glycerol dichlorohydrin, or beta-methylepichlorohydrin in the presence of an alkali. Such polyglycidyl esters may be derived from aliphatic carboxylic acids, e.g., oxalic acid, succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene)glycols, propane-1,2-diol and poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol, sorbitol, and polyepichlorohydrins; from cycloaliphatic alcohols such as resorcitol, quinitol, bis(4-hydroxycyclohexyl)methane, 2,2-bis(4-hydroxycyclohexyl)propane, and 1,1-bis(hydroxymethyl)cyclohex-3-ene; and from alcohols having aromatic nuclei, such as N,N-bis(2-hydroxyethyl)aniline. They may also be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl)sulphone, 1,1,2,2-tetrakis(4-hydroxyphenyl)ethane, 2,2-bis(4-hydroxyphenyl)propane, 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenol, 2-methylphenol, and 4-tert.butylphenol.

Poly(N-glycidyl) compounds include, for example, those obtained by dehydrochlorination of the reaction products of epichlorohydrin with amines containing at least two amino-hydrogen atoms, such as aniline, bis(4- aminophenyl)methane, m-xylylenediamine, and bis(4-methylaminophenyl)methane; triglycidyl isocyanurate; and N,N'-diglycidyl derivatives of cyclic alkylene ureas, such as ethyleneurea and 1,3-propyleneurea, and of a hydantoin such as 5,5-dimethylhydantoin.

Examples of poly(S-glycidyl) compounds are di-S-glycidyl derivatives of dithiols such as ethane-1,2-dithiol and bis(4-mercaptomethylphenyl) ether.

Epoxide resins having the glycidyl groups attached to different kinds of hetero atoms may be employed, e.g. the N,N,O-triglycidyl derivative of 4-aminophenol, the glycidyl ether-glycidyl ester of salicylic acid, N-glycidyl-N'-(2-glycidyloxypropyl)-5,5-dimethylhydantoin, and 2-glycidyloxy-1,3-bis(5,5-dimethyl-1-glycidylhydantoin-3-yl)propane.

If desired, a mixture of epoxide resins may be used.

Preferred epoxide resins are liquids, and include polyglycidyl ethers, polyglycidyl esters, N,N'-diglycidylhydantoins, and poly(N-glycidyl) derivatives of aromatic amines. Specific preferred resins are polyglycidyl ethers of 2,2-bis(4-hydroxyphenyl)propane, of bis(4-hydroxyphenyl)methane, of butane-1,4-diol or of a novolak formed from formaldehyde and phenol or phenol substituted in the ring by one chlorine atom or by one alkyl hydrocarbon group containing from one to nine carbon atoms, and having a 1,2-epoxide content of at least 0.5 equivalent per kilogram, bis(4-(diglycidylamino)phenyl)methane, p-(diglycidylamino)phenyl glycidyl ether, and mixtures of two or more of these resins.

The latent curing agent (B) may be dicyandiamide or a hydrazide of a polycarboxylic acid. Suitable hydrazides include dihydrazides of aliphatic or aromatic dicarboxylic acids, such as stearic dihydrazide, adipic dihydrazide and isophthalic dihydrazide, with the last two being preferred.

The Mannich base (C) dispersed in the composition is generally a Mannich reaction product of a polymeric phenol, an aldehyde and a primary or secondary amine.

The polymeric phenol from which the Mannich base (C) is prepared generally has at least three repeating units each having at least one phenolic hydroxyl group. Usually, when based on an addition polymer, the polymeric phenol has a weight average molecular weight of at least 500, preferably at least 1000. Preferred such polymeric phenols include polymers, which may be homopolymers or copolymers, of ethylenically unsaturated phenols.

As examples of such polymers of unsaturated phenols there may be mentioned homopolymers of allyl-substituted phenols, such as 2-allylphenol and 4-allylphenol; homopolymers of phenols having substituents containing acrylic unsaturation, for example phenols which are reaction products of an acid halide of a phenolic hydroxyl group-containing carboxylic acid such as salicylic acid or p-hydroxybenzoic acid with a hydroxyalkyl acrylate or methacrylate such as 2-hydroxyethyl methacrylate; homopolymers of vinyl- or 1-propenyl-substituted phenols such as o-vinylphenol, m-vinylphenol, p-vinylphenol and halogenated derivatives thereof, and o-(1-propenyl)phenol, m-(1-propenyl)phenol, p-(1-propenyl)phenol and halogenated derivatives thereof; copolymers of any of the abovementioned phenols with at least one other polymerisable ethylenically unsaturated material, for example a styrene such as styrene itself, alpha-methylstyrene, 4-bromostyrene and 4-methylstyrene, an acrylic ester such as an alkyl acrylate or methacrylate or a hydroxyalkyl acrylate or methacrylate, or a vinyl ester such as vinyl acetate; and mixtures of two or more of the abovementioned homopolymers and/or copolymers. The addition homopolymers and copolymers of unsaturated phenols can be prepared using conventional polymerization techniques, either from the unsaturated phenols themselves or from their esters or ethers. When the esters or ethers are used, the resulting polymers can be hydrolysed to convert the ester or ether groups to free phenolic hydroxyl groups.

Preferred polymers of ethylenically unsaturated phenols are polymers of a vinylphenol having a weight average molecular weight of at least 1500. Especially preferred such vinylphenol polymers are homopolymers having repeating units of formula

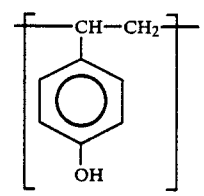

I and copolymers having units of formula I together with units derived from at least one other vinyl monomer, preferably styrene or an alkyl or hydroxyalkyl acrylate or methacrylate such as methyl methacrylate or 2-hydroxyethyl methacrylate, the polymers having a weight average molecular weight of 1500 to 50,000, particularly 2000 to 30,000.

Other preferred polymeric phenols are phenolic novolak resins. Suitable such resins are those prepared from a phenol, which may be a mononuclear phenol, such as phenol itself and alkyl-substituted mononuclear phenols, or a polynuclear phenol, particularly a bisphenol such as bisphenol F or bisphenol A, and an aldehyde such as acetaldehyde, benzaldehyde, furfuraldehyde or, preferably, formaldehyde.

Preferred novolak resins are phenol-formaldehyde novolak resins, preferably those prepared using a phenol:formaldehyde molar ratio of from 1:0.5 to 1:1, especially from 1:0.7 to 1:0.95, and cresol-formaldehyde novolak resins, preferably o-cresol-formaldehyde resins, those prepared using a cresol:formaldehyde molar ratio of from 1:0.9 to 1:1.2, especially from 1:1 to 1:1.1, being preferred.

The aldehyde from which the Mannich base (C) is prepared may be an aromatic aldehyde such as benzaldehyde; it is preferably an aliphatic aldehyde such as formaldehyde or acetaldehyde. Formaldehyde is especially preferred; it may be used as an aqueous or alcoholic solution, but is preferably used as paraformaldehyde.

Amines from which the Mannich base (C) may be prepared include aliphatic and heterocyclic secondary amines, preferably aliphatic secondary amines of formula $R^1$—NH—$R^2$ where $R^1$ and $R^2$ each denote an alkyl group or a hydroxyl-substituted alkyl group, $R^1$ and $R^2$ preferably each having from 1 to 10 carbon atoms, and heterocyclic secondary amines having five or six atoms in the heterocyclic ring. Examples of such amines are dialkylamines such as dimethylamine, diethylamine, di-n-propylamine, di-n-butylamine, di-isobutylamine, di-n-amylamine, di-isoamylamine, di-n-hexylamine, and dioctylamines; dialkanolamines such as diethanolamine, dipropanolamines and dibutanolamines; N-alkylalkanolamines such as N-methylethanolamine and N-methylpropanolamines; and heterocyclic amines such as morpholine or piperidine. Other amines from which the Mannich base (C) may be prepared include araliphatic amines, usually primary amines, preferably aralkylamines such as benzylamine.

Especially preferred amines from which the Mannich base (C) is prepared are dimethylamine, N-methylethanolamine, morpholine and benzylamine.

The preparation of the Mannich base (C), by reaction of the polymeric phenol, the aldehyde and the primary or secondary amine, may be carried out under conventional Mannich reaction conditions. The reaction may be effected in an inert solvent such as an alcohol or ether at ambient and/or elevated temperature, preferably at 15° to 150° C., optionally in the presence of an alkali metal hydroxide to aid solution formation where paraformaldehyde is used. The reactants may be used in amounts such that the ratio of aldehyde:phenol equivalents is from 0.2–2:1, preferably 0.4–1.4:1, and the ratio of aldehyde:amine equivalents if from 0.3–1.5:1, preferably 0.5–1:1. Detailed procedures for effecting a Mannich reaction between a vinylphenol polymer, formaldehyde and an amine are described in British Patent Specification No. 1 428 835.

Generally, when the Mannich reaction has been carried out for the desired time, part of the reaction solvent is removed and the Mannich base (C) is precipitated by pouring the reaction mixture into water. The precipitated solid is filtered off and dried, optionally followed by steam distillation and further drying. The dried Mannich base is generally ground to a fine powder, for example a powder having a particle size finer than 100 mesh (0.15 mm), before being mixed with the other components of the curable composition. Coarser particles of the Mannich base can usually be included in the composition since mixing of the components of the composition is conveniently carried out using conventional mixing equipment such as roll mills, which mixing can effect a reduction in the particle size.

The amount of latent curing agent (B) used in the composition of the invention may be the amount conventionally used for the particular curing agent and epoxide resin. Such amounts are well known by those familiar with the formulation of curable epoxide resin compositions. When (B) is dicyandiamide the amount is generally within the range of 1 to 30, preferably 3 to 20, especially 5 to 10, parts by weight per 100 parts by weight of the epoxide resin (A). When (B) is a hydrazide of a polycarboxylic acid, the amount is generally such as to provide from 0.5 to 1.5, preferably 0.8 to 1.2, especially 0.9 to 1.1, active amino-hydrogen equivalents per epoxide equivalent of the epoxide resin (A).

The amount of the Mannich base accelerator (C) is not critical, provided an effective amount is present to give an accelerating effect. Generally, amounts within the range 0.1 to 20%, preferably 1 to 10, especially 1.5 to 7%, by weight of the epoxide resin (A) are used.

The compositions of the invention may contain additives such as those conventionally incorporated in epoxide resin compositions in order to improve their physical or chemical properties in the cured or uncured state including, for example, pigments, dyes, flexibilisers, plasticisers, fillers, thixotropic agents and fire retardants. Suitable polymeric materials which can be added as toughening agents include acrylic esters of epoxide resins, polyurethane prepolymers, blocked polyisocyanates and elastomeric butadiene polymers.

As hereinbefore described, preferred epoxide resins (A) are liquid resins. Curable liquid compositions containing such resins may vary from unfilled compositions of low viscosity, for instance compositions containing reactive diluents, for example monoglycidyl ethers such as cresyl glycidyl ether or a glycidyl ether of a $C_2$–$C_4$ aliphatic alcohol such as butane-1,4-diol, to pastes or putties which can contain large amounts of fillers or other additives. Compositions of the invention may also be in the form of films or sheets, which may be fibre-reinforced and may be supported on a carrier such as a glass fibre fabric.

Compositions of the invention can be cured by heating at elevated temperatures, generally from 120° to 220° C., preferably from 140° to 210° C., especially from 160° to 200° C. Cure can be effected in less than one minute, particularly at the higher temperatures within these ranges, but the heating can be continued, for example for up to 3 hours, to improve the physical properties of the cured product. When rapid heating is required, for example in the bonding or sealing of automobile components, this is conveniently achieved by the use of induction heating.

The curable compositions may be used as coating, casting or laminating resins or, more particularly, as adhesives or sealants. The invention also provides a method of bonding or sealing two surfaces together which comprises applying a composition of the invention to one or both surfaces, placing the two surfaces together with the composition positioned therebetween and heating the resulting assembly until the composition is cured. This method may be used with surfaces of metal, such as steel or aluminium, plastic materials, glass, friction materials such as brake linings, and ceramic materials. It is particularly useful when both surfaces are of metal.

The invention is illustrated by the following Examples, in which parts and percentages are by weight unless otherwise indicated.

The accelerators used in the Examples are prepared as follows:

Accelerator I

A poly(vinylphenol) having a weight average molecular weight of 10,000 and available from Maruzen Petrochemical KK, Tokyo, Japan under the designation "Maruka Lyncur-M Grade S-4" (60 parts) is dissolved in methanol (120 parts). To the solution is added a solution of dimethylamine (22.5 parts) in methanol (47.5 parts). To the resulting solution is added a solution of paraformaldehyde (14.3 parts) and aqueous 47% sodium hydroxide (0.15 part) in methanol (25 parts) over 30 minutes with stirring, cooling if necessary to keep the temperature of the reaction mixture below 30° C. Stirring is continued for a further hour and the mixture is then heated to reflux temperature (66° C.), reflux being maintained for 2 hours. A half of the methanol is removed by distillation under vacuum. The remaining mixture is cooled to 25° C. and poured into ice-water. The solid which precipitates is filtered off and dried at 45° C. to constant weight. The Mannich base product has an amino-nitrogen content of 5.37 equivs/kg.

Accelerator II

This is prepared by the procedure used for the preparation of Accelerator I but using, instead of Lyncur-M Grade S-4, a poly(p-vinylphenol) having a weight average molecular weight of 2,000, available from Maruzen Petrochemical KK under the designation "Maruka Lyncur-M Grade S-1" (60 parts). The Mannich base product has an amino-nitrogen content of 5.14 equivs/kg.

Accelerator III

This is prepared by the procedure used for the preparation of Accelerator II, but using 11.3 parts of dimethylamine in 23.7 parts of methanol, and 7.12 parts of paraformaldehyde and 0.1 part of aqueous 47% sodium hydroxide in 23.7 parts of methanol instead of the amounts used in the preparation of Accelerator II. The Mannich base product has an amino-nitrogen content of 3.22 equivs./kg.

Accelerator IV

This is prepared by the procedure used for the preparation of Accelerator I but using, instead of Maruka Lyncur-M Grade S-4, a poly(p-vinylphenol) having a weight average molecular weight of 30,000, available from Maruzen Petrochemical KK under the designation "Maruka Lyncur-M Grade H-3" (60 parts), morpholine (65.3 parts) in 43 parts of methanol, instead of dimethylamine in methanol, and 21.4 parts of paraformaldehyde and 0.22 part of aqueous 47% sodium hydroxide in 37 parts of methanol. The Mannich base product has an amino-nitrogen content of 5.12 equivs./kg.

Accelerator V

This is prepared by the procedure used for the preparation of Accelerator I, but using benzylamine (53.5 parts) without methanol, instead of dimethylamine in methanol, and using 0.12 part of the aqueous 47% sodium hydroxide. The Mannich base product has an amino-nitrogen content of 3.87 equivs/kg.

Accelerator VI

This is prepared by the procedure used for the preparation of Accelerator I, but using morpholine (43.5 parts) in 46 parts of methanol instead of dimethylamine in methanol. The Mannich base product has an amino-nitrogen content of 4.10 equivs/kg.

Accelerator VII

This is prepared by the procedure used for the preparation of Accelerator I but using, instead of Maruka Lyncur-M Grade S-4, a copolymer of 70 mol % p-vinylphenol and 30 mol % styrene having a weight average molecular weight of 3,400, available from Maruzen Petrochemical KK under designation CST-70, (28.8 parts), in 60 parts of methanol and using 7.9 parts of dimethylamine in 16.5 parts of methanol and 5.0 parts of paraformaldehyde and 0.1 part of aqueous 47% sodium hydroxide in 9 parts of methanol. The Mannich base product has an amino-nitrogen content of 4.12 equivs/kg.

Accelerator VIII

This is prepared by the procedure used for the preparation of Accelerator I, but using 33.8 parts of dimethylamine in 71.2 parts of methanol and 21.4 parts of paraformaldehyde and 0.24 part of aqueous 47% sodium hydroxide in 37 parts of methanol. The Mannich base product has an amino-nitrogen content of 6.67 equivs/kg.

Accelerator IX

This is prepared by the procedure used for the preparation of Accelerator IV, but using dimethylamine (22.5 parts) in 47.5 parts of methanol instead of morpholine in methanol and using 14.3 parts of paraformaldehyde and 0.17 part of aqueous 47% sodium hydroxide in 47.5 parts of methanol. The Mannich base product has an amino-nitrogen content of 5.32 equivs./kg.

Accelerator X

This is prepared by the procedure used for the preparation of Accelerator I, but using N-methylethanolamine (37.5 parts) in 45 parts of methanol instead of dimethylamine in methanol. The Mannich base product has an amino-nitrogen content of 4.05 equivs./kg.

Accelerator XI

A solution of dimethylamine (50.6 parts) in methanol (101.2 parts) is added to a solution of Maruka Lyncur-M Grade S-4 (135 parts) in methanol (270 parts) over 1 hour at 15° C. A solution of paraformaldehyde (32 parts) in methanol (56.2 parts) is added over 1 hour, whilst cooling to maintain the mixture at 20°–25° C. This temperature is maintained for a further hour, then the mixture is heated under reflux for 2 hours. The resulting solution is heated under vacuum at 60° C. to remove 200 parts of methanol and then added to water (1000 parts). The precipitate is filtered off, dried and then steam distilled in water to give, after drying, 190 parts of a Mannich base product with an amino-nitrogen content of 5.0 equivalents/kg.

Accelerator XII

A novolak preprared from phenol and formaldehyde in the molar ratio 1:0.85 and softening in the range 70° C.–90° C. (60.3 parts) is dissolved in methanol (120 parts). To the solution is added a solution of dimethylamine (12.8 parts) in methanol (25.6 parts). To the resulting solution is added a solution of paraformaldehyde (8.12 parts) and aqueous 47% sodium hydroxide (0.1 part) in methanol (16.1 parts) over 30 minutes with stirring, cooling if necessary to keep the temperature below 30° C. Stirring is continued for a further hour and the mixture is then heated to reflux temperature, reflux being maintained for 2 hours. Most of the methanol (137 parts) is removed by distillation under vacuum. Acetone (60 parts) is added to the resulting mixture to dissolve precipitated material. The mixture is cooled to ambient temperature and poured into ice-water. The solid which precipitates is filtered off and dried at 45° C. to constant weight. The Mannich base product has an amino-nitrogen content of 3.20 equivs/kg.

Accelerator XIII

This is prepared by the procedure used for the preparation of Accelerator XII, but using 37.5 parts of the novolak dissolved in 76.5 parts of methanol, 12 parts of dimethylamine dissolved in 23.9 parts of methanol and 7.57 parts of paraformaldehyde and 0.11 part of aqueous 47% sodium hydroxide in 15.5 parts of methanol, instead of the amounts used in the preparation of Accelerator XII. In the vacuum distillation, 89 parts of methanol are removed; 45 parts of acetone are added to dissolve material precipitated during this distillation. The Mannich base product has an amino-nitrogen content of 4.31 equivs/kg.

Accelerator XIV

This is prepared by the procedure used for the preparation of Accelerator XII, but using, instead of the phenol-formaldehyde novolak, a novolak prepared from o-cresol and formaldehyde in the molar ratio 1:1.05 and softening at 102° C. (72.3 parts) in 147 parts of methanol, and using 13.7 parts of dimethylamine in 27.3 parts of methanol and 8.59 parts of paraformaldehyde and 0.13 part of aqueous 47% sodium hydroxide in 19.4 parts of methanol, instead of the amounts used in the preparation of Accelerator XII. In the vacuum distillation, 156 parts of methanol are removed and no material is precipitated, so no acetone is added. The Mannich base product has an amino-nitrogen content of 2.42 equivs/kg.

Accelerator XV

This is prepared by the procedure used for the preparation of Accelerator XII, but using 73.2 parts of the novolak dissolved in 142 parts of methanol, morpholine (30.1 parts) instead of dimethylamine in methanol, and 9.84 parts of paraformaldehyde and 0.13 part of aqueous 47% sodium hydroxide in 19.2 parts of methanol. In the vacuum distillation, 143 parts of methanol are removed, 29 parts of acetone being added to the residual mixture to dissolve precipitated material. The Mannich base product has an amino-nitrogen content of 2.94 equivs/kg.

Accelerator XVI

This is prepared by the procedure used for the preparation of Accelerator XIV, but using 67.3 parts of the novolak dissolved in 132 parts of methanol, morpholine (24.5 parts) instead of dimethylamine in methanol, and 8.05 parts of paraformaldehyde and 0.13 part of aqueous 47% sodium hydroxide in 17.9 parts of methanol. In the vacuum distillation, 128 parts of methanol are removed and no material is precipitated, so no acetone is added. The Mannich base product has an amino-nitroen content of 2.77 equivs/kg.

Accelerator XVII

A "high ortho" novolak prepared using the process described in British Patent Specification No. 615 335, from phenol and formaldehyde in the molar ratio 1:0.76 using zinc oxide as catalyst, and softening at 91° C. (20.2 parts) is dissolved in methanol (40 parts). To the solution is added a solution of dimethylamine (4.31 parts) in methanol (8.62 parts). To the resulting solution is added a solution of paraformaldehyde (2.72 parts) and aqueous 47% sodium hydroxide (0.15 part) in methanol (5.7 parts) over 30 minutes with stirring, cooling if necessary to keep the temperature below 30° C. Stirring is continued for a further hour and the mixture is then heated to reflux temperature, reflux being maintained for 2 hours.

The precipitated solid is filtered off, washed with methanol and dried at 45° C. to constant weight.

EXAMPLES 1-6

Curable paste compositions are prepared by grinding and passing through a sieve having a mesh size of 0.15 mm dicyandiamide (7.5 parts) as hardener (curing agent) and one of Accelerators I-V and IX and dispersing the resulting powders, together with highly dispersed silica (5 parts) as filler, in a diglycidyl ether of bisphenol A having an epoxide content of 5.2 equivs./kg (100 parts). The gelation times of the compositions at particular temperatures are measured by placing a sample of 5 mm diameter and 1 mm thickness on a surface maintained at the test temperature and observing the time taken for gelation to occur. The storage lives of the compositions are determined by storing them in tubes in a fanned oven at 40° C., the end of the storage life being taken to be the time when the composition can no longer be spread at ambient temperature.

The nature and the amount of the accelerator in the compositions, together with the gel times and storage lives of the compositions, are given in Table 1.

TABLE 1

| Ex. | Accelerator | Amount (Parts) | Gel Time (min) 140° C. | 160° C. | 180° C. | Storage Life |
|---|---|---|---|---|---|---|
| 1 | I | 3.7 | 11 | 2.5 | 1.2 | 45 weeks |
| 2 | II | 1.9 | 19 | 3.3 | 0.9 | 10 weeks |
| 3 | III | 6.2 | 3 | 1.3 | 0.5 | 11 weeks |
| 4 | IV | 5.9 | 40 | 13 | 3.0 | 46 days |
| 5 | V | 5.2 | 51 | 14 | 2.1 | 27 weeks |
| 6 | IX | 1.9 | 17 | 5.2 | 1.4 | More than 49 weeks |

The compositions of Examples 1 and 3 gel in 40 minutes and 11 minutes respectively at 120° C.

EXAMPLES 7-8

The procedure of Examples 1-6 is repeated using a mixture of 80 parts of the diglycidyl ether used in those Examples and 20 parts of a diglycidyl ether of butane-1,4-diol having an epoxide content of 8.8 equivs./kg instead of the 100 parts of diglycidyl ether used in Examples 1-6, increasing the amount of dicyandiamide to 8.6 parts and using Accelerator I or VI in place of the accelerators used in those Examples.

The gel times and storage lives are given in Table 2.

TABLE 2

| Ex. | Accelerator | Amount (Parts) | Gel Time (min) 140° C. | 160° C. | 180° C. | Storage Life |
|---|---|---|---|---|---|---|
| 7 | I | 3.7 | 4 | 1.3 | 0.8 | 11 weeks |
| 8 | VI | 4.9 | 38 | 13 | 1.8 | 11 days |

The composition of Example 7 gels in 16 minutes at 120° C.

EXAMPLES 9-12

The procedure of Examples 1-6 is repeated, replacing the dicyandiamide used in those Examples by adipic dihydrazide (23.1 parts) and using one of Accelerators I, VII, VIII and IX.

The gel times and storage lives are given in Table 3.

TABLE 3

| Ex. | Accelerator | Amount (Parts) | Gel Time (min) 140° C. | 160° C. | 180° C. | Storage Life |
|---|---|---|---|---|---|---|
| 9 | I | 1.8 | 29 | 4.8 | 1.4 | 9 weeks |
| 10 | VII | 2.0 | 20 | 4.8 | 0.8 | 20 weeks |
| 11 | VIII | 1.5 | 24 | 6.1 | 0.9 | 20 weeks |
| 12 | IX | 1.9 | 20 | 4.2 | 0.7 | 20 weeks |

EXAMPLES 13-17

The procedure of Examples 1-6 is repeated, replacing the dicyandiamide by isophthalic dihydrazide (25.2 parts) and using one of Accelerators I, III, IV and X.

The gel times and storage lives are given in Table 4.

TABLE 4

| Ex. | Accelerator | Amount (Parts) | Gel Time (min) 140° C. | 160° C. | 180° C. | Storage Life |
|---|---|---|---|---|---|---|
| 13 | I | 3.7 | 11 | 2.3 | 0.8 | 9 weeks |
| 14 | I | 1.8 | 21 | 6 | 1.5 | 10 weeks |
| 15 | IV | 1.9 | 45 | 17 | 3.7 | 39 days |
| 16 | III | 6.2 | 3.5 | 1.3 | 0.5 | 25 days |
| 17 | X | 4.1 |  | 14 | 3.7 | 8 weeks |

EXAMPLES 18-34

In order to test the compositions used in Examples 1 to 17 for bubble formation, 60 parts of talc is added to the compositions and the amount of silica is reduced to 3 parts. The compositions are tested by placing them in a vacuum oven at 55° C. to remove entrapped air, curing them in films 2 mm thick for 5 minutes at 200° C., allowing the cured films to cool and examining them for bubble formation.

In order to test the adhesive strength of joints made using the compositions of Examples 1 to 17 as adhesives, glass microspheres (1 part) are added to the compositions to control glue-line thickness. The compositions are applied to degreased, grit-blasted steel plates of length 150 mm, width 25.4 mm and thickness 1.6 mm and lap joints are prepared having an overlap area of 645 mm². Cure is effected at 200° C. for 5 minutes (Cure Cycle I), at 200° C. for 10 minutes (Cure Cycle II) or at 180° C. for 10 minutes (Cure Cycle III). After allowing the joints to cool to ambient temperature, the lap shear strength is measured (average of 3 replicates) at a pulling rate of 7.5 mm/min.

The nature and amount of the hardener (curing agent) and the accelerator, the lap shear strength and the cure cycle therefor and the results of the bubble test are given in Table 5. In this Table, DCY denotes dicyandiamide, AD denotes adipic dihydrazide and ID denotes isophthalic dihydrazide. The epoxide resins used in Examples 18 to 34 are those used in Examples 1 to 17 respectively.

TABLE 5

| Ex. | Hardener & Amount (Parts) | Accelerator & Amount (Parts) | Cure Cycle | Lap Shear Strength (MPa) | Bubble Test |
|---|---|---|---|---|---|
| 18 | DCY 7.5 | I 3.7 | II | 14.6 | No bubbles |
| 19 | " | II 1.9 | I | 10.7 | " |
| 20 | " | III 6.2 | I | 10.3 | " |
| 21 | " | IV 5.9 | II | 16.1 | " |
| 22 | " | V 5.2 | II | 15.5 | " |
| 23 | " | IX 1.9 | II | 15.6 | " |
| 24 | DCY 8.6 | I 3.7 | III | 14.6 | " |
| 25 | " | VI 4.9 | I | 15.4 | " |
| 26 | AD 23.1 | I 1.8 | I | 14.9 | " |
| 27 | " | VII 2.0 | I | 14.8 | " |
| 28 | " | VIII 1.5 | III | 14.3 | " |
| 29 | " | IX 1.9 | III | 14.8 | " |
| 30 | ID 25.2 | I 3.7 | I | 14.6 | " |
| 31 | " | I 1.8 | I | 14.6 | " |
| 32 | " | IV 1.9 | III | 14.5 | " |
| 33 | " | III 6.2 | III | 14.4 | " |
| 34 | " | X 4.1 | III | 14.1 | " |

EXAMPLES 35-36

The procedure of Examples 7 and 8 is repeated using different amounts of Accelerator XI in place of the accelerators used in those Examples, additionally determining the gel time at 120° C.

The gel times and storage lives are given in Table 6.

TABLE 6

| Ex. | Accelerator Amount (Parts) | Gel Time (min) 120° C. | 140° C. | 160° C. | 180° C. | Storage Life |
|---|---|---|---|---|---|---|
| 35 | 2.0 | 21 | 8.7 | 2.8 | 0.7 | 30 weeks |
| 36 | 4.0 | 10.5 | 4.2 | 1.1 | 0.5 | 30 weeks |

EXAMPLE 37

The procedure of Examples 18-23 for measuring adhesive strength is repeated using Accelerator XI (4 parts) in place of the accelerators used in those Examples and curing at 200° C. for 5 minutes. The lap shear strength of the joints obtained is 15.8 MPa.

EXAMPLES 38-42

The procedure of Examples 1-6 is repeated, using one of Accelerators XII to XVI in place of the accelerators used in those Examples.

The nature and the amount of the accelerator in the compositions, together with the gel times and storage lives of the compositions, are given in Table 7.

TABLE 7

| Ex. | Accelerator | Amount (Parts) | Gel Time (min) 140° C. | 160° C. | 180° C. | Storage Life |
|---|---|---|---|---|---|---|
| 38 | XII | 3.2 | 9.7 | 2.9 | 0.9 | More than 25 weeks |
| 39 | XV | 3.4 |  | 27 | 5.0 | 25 days |

TABLE 7-continued

| Ex. | Accelerator | Amount (Parts) | Gel Time (min) 140° C. | 160° C. | 180° C. | Storage Life |
|---|---|---|---|---|---|---|
| 40 | XIV | 2.1 | 31 | 6.3 | 1.9 | 13 weeks |
| 41 | XVI | 3.6 | | 18 | 4.0 | 5 weeks |
| 42 | XIII | 2.3 | 13 | 2.7 | 1.0 | More than 24 weeks |

EXAMPLES 43–44

The procedure of Examples 1–6 is repeated using a mixture of 80 parts of the diglycidyl ether used in those Examples and 20 parts of a diglycidyl ether of butane-1,4-diol having an epoxide content of 8.8 equivs./kg instead of the 100 parts of diglycidyl ether used in Examples 1–6, increasing the amount of dicyandiamide to 8.6 parts and using Accelerator XII or XV.

The gel times and storage lives are given in Table 8.

TABLE 8

| Ex. | Accelerator | Amount (Parts) | Gel Time (min) 140° C. | 160° C. | 180° C. | Storage Life |
|---|---|---|---|---|---|---|
| 43 | XII | 3.2 | 6.3 | 2.3 | 0.7 | 24 weeks |
| 44 | XV | 3.4 | 60 | 13 | 3.3 | 25 days |

The composition of Example 43 gels in 31 minutes at 120° C.

EXAMPLES 45–47

The procedure of Examples 1–6 is repeated, replacing the dicyandiamide used in those Examples by adipic dihydrazide (23.1 parts) and using one of Accelerators XII, XVI and XVII.

The gel times and storage lives are given in Table 9.

TABLE 9

| Ex. | Accelerator | Amount (parts) | Gel Time (min) 140° C. | 160° C. | 180° C. | Storage Life |
|---|---|---|---|---|---|---|
| 45 | XII | 3.2 | 9.2 | 3.1 | 0.7 | More than 25 weeks |
| 46 | XVII | 3.2 | 36 | 6.0 | 0.7 | 24 weeks |
| 47 | XVI | 3.6 | 26 | 6.4 | 1.2 | 5 weeks |

EXAMPLES 48–50

The procedure of Examples 1–6 is repeated, replacing the dicyandiamide by isophthalic dihydrazide (25.2 parts) and using one of Accelerators XII, XIV and XV.

The gel times and storage lives are given in Table 10.

TABLE 10

| Ex. | Accelerator | Amount (Parts) | Gel Time (min) 140° C. | 160° C. | 180° C. | Storage Life |
|---|---|---|---|---|---|---|
| 48 | XII | 3.2 | 5.8 | 1.9 | 0.6 | 20 weeks |
| 49 | XV | 3.4 | 35 | 9.0 | 3.0 | 18 days |
| 50 | XIV | 2.1 | 10 | 3.8 | 1.2 | 3 weeks |

EXAMPLES 51–63

In order to test the compositions used in Examples 38 to 50 for bubble formation, 60 parts of talc is added to the compositions and the amount of silica is reduced to 3 parts. The compositions are tested by placing them in a vacuum oven at 55° C. to remove entrapped air, curing them in films 2 mm thick for 5 minutes at 200° C., allowing the cured films to cool and examining them for bubble formation.

In order to test the adhesive strength of joints made using the compositions of Examples 48 to 50 as adhesives, glass microspheres (1 part) are added to the compositions to control glue-line thickness. The compositions are applied to degreased, grit-blasted steel plates of length 150 mm, width 25.4 mm and thickness 1.6 mm and lap joints are prepared having an overlap area of 645 mm². Cure is effected at 200° C. for 5 minutes (Cure Cycle I), or at 180° C. for 10 minutes (Cure Cycle III). After allowing the joints to cool to ambient temperature, the lap shear strength is measured (average of 3 replicates) at a pulling rate of 7.5 mm/min.

The nature and amount of the hardener (curing agent) and the accelerator, the lap shear strength and the cure cycle therefor and the results of the bubble tests are given in Table 11. In this Table, DCY denotes dicyandiamide, AD denotes adipic dihydrazide and ID denotes isophthalic dihydrazide. The epoxide resins used in Examples 51 to 63 are those used in Examples 38 to 50 respectively.

TABLE 11

| Ex. | Hardener & Amount (Parts) | Accelerator & Amount (Parts) | Cure Cycle | Lap Shear Strength (MPa) | Bubble Test |
|---|---|---|---|---|---|
| 51 | DCY 7.5 | XII 3.2 | III | 14.5 | No bubbles |
| 52 | " | XV 3.4 | I | 14.4 | " |
| 53 | " | XIV 2.1 | III | 15.0 | " |
| 54 | " | XVI 3.6 | I | 7.8 | " |
| 55 | " | XIII 2.3 | III | 16.7 | " |
| 56 | DCY 8.6 | XII 3.2 | III | 15.0 | " |
| 57 | " | XV 3.4 | I | 12.8 | " |
| 58 | AD 23.1 | XII 3.2 | III | 8.0 | " |
| 59 | " | XVII 3.2 | I | 11.2 | " |
| 60 | " | XVI 3.6 | III | 10.4 | " |
| 61 | ID 25.2 | XII 3.2 | III | 8.9 | " |
| 62 | " | XV 3.4 | I | 10.6 | " |
| 63 | " | XIV 2.1 | III | 12.0 | " |

What is claimed is:

1. A curable composition comprising
(A) an epoxide resin
(B) as latent curing agent for (A), dicyandiamide or a polycarboxylic acid hydrazide, and (C) as cure accelerator dispersed as a powder in the composition, a Mannich base of a polymeric phenol.

2. A composition according to claim 1, in which the epoxide resin (A) is a liquid and is a polyglycidyl ether, a polyglycidyl ester, a N,N'-diglycidylhydantoin or a poly(N-glycidyl) derivative of an aromatic amine.

3. A composition according to claim 1, in which the Mannich base (C) is a Mannich reaction product of a polymeric phenol, an aldehyde and a primary or secondary amine.

4. A composition according to claim 1, in which the polymeric phenol has at least three repeating units each containing at least one phenolic hydroxyl group.

5. A composition according to claim 1, in which the polymeric phenol is a polymer of an ethylenically unsaturated phenol.

6. A composition according to claim 5, in which the polymeric phenol is a polymer of a vinylphenol having a weight average molecular weight of at least 1500.

7. A composition according to claim 1, in which the polymeric phenol is a homopolymer having repeating units of formula

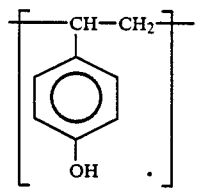

I or a copolymer having units of formula I together with units derived from at least one other vinyl monomer, the polymeric phenol having a weight average molecular weight of 1500 to 50,000.

8. A composition according to claim 7, in which the polymeric phenol has a weight average molecular weight of 2000 to 30,000.

9. A composition according to claim 1, in which the polymeric phenol is a phenolic novolak resin.

10. A composition according to claim 9, in which the polymeric phenol is a phenol-formaldehyde novolak resin or cresol-formaldehyde novolak resin.

11. A composition according to claim 3, in which the aldehyde from which the Mannich base (C) is prepared is an aliphatic aldehyde.

12. A composition according to claim 11, in which the aliphatic aldehyde is formaldehyde.

13. A composition according to claim 3, in which the amine from which the Mannich base (C) is prepared is an aliphatic or heterocyclic secondary amine or an araliphatic amine.

14. A composition according to claim 13, in which the amine is an aliphatic secondary amine of formula $R^1$—NH—$R^2$ where $R^1$ and $R^2$ each denote an alkyl group or a hydroxyl-substituted alkyl group, a heterocyclic secondary amine having five or six atoms in the heterocyclic ring or an aralkylamine.

15. A composition according to claim 14, in which the amine is dimethylamine, N-methylethanolamine, morpholine or benzylamine.

16. A composition according to claim 1, in which the accelerator (C) is present in an amount of 0.1 to 20% by weight of the epoxide resin (A).

17. A composition according to claim 16, in which the accelerator (C) is present in an amount of 0.1 to 10% by weight of the epoxide resin (A).

18. A composition according to claim 1 cured by heating.

* * * * *